W. McCRAY.
Pruning-Shears.
No. 138,340. Patented April 29, 1873.
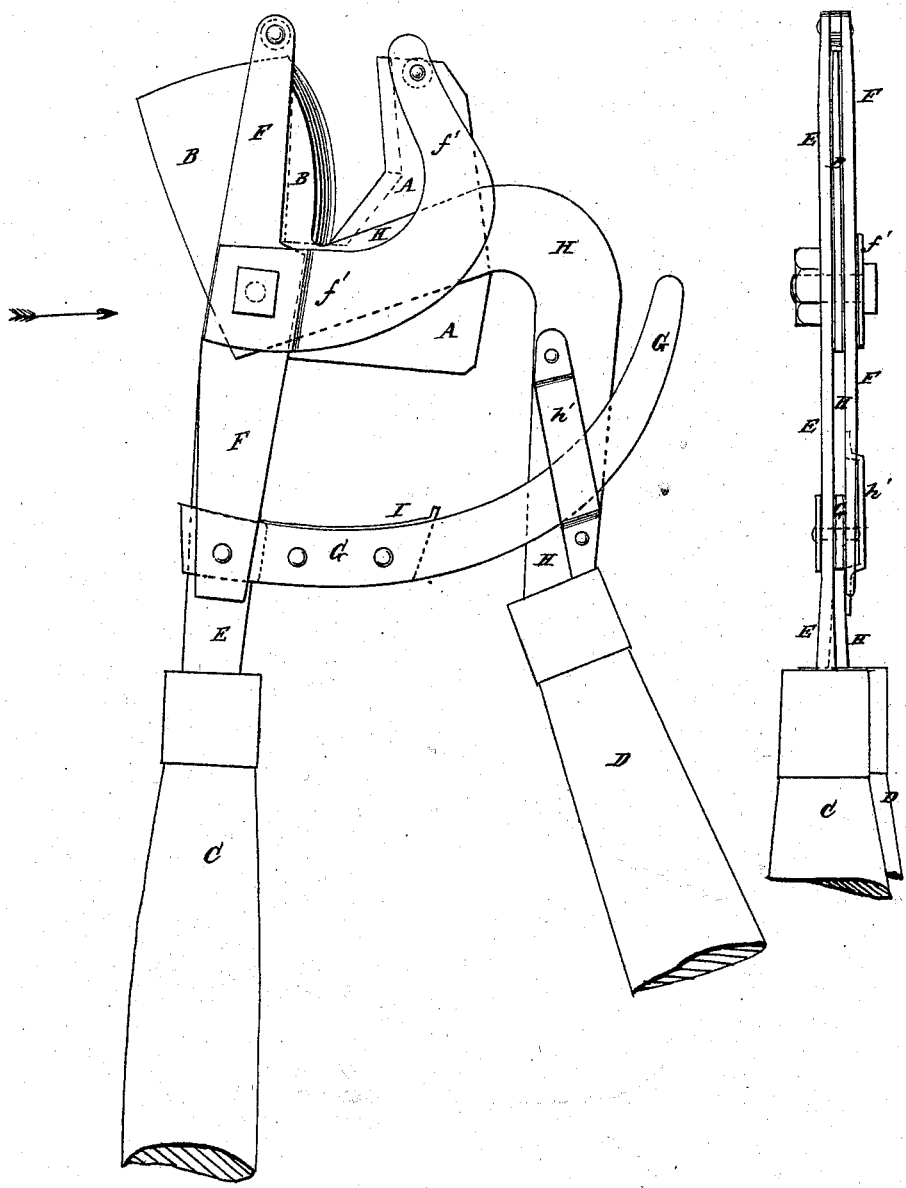
Witnesses:
A. W. Almqvist
C. Sedgwick
Inventor:
W. McCray
Per ——— Attorneys.

UNITED STATES PATENT OFFICE.

WILLIAM McCRAY, OF BLACK OAK, MISSOURI.

IMPROVEMENT IN PRUNING-SHEARS.

Specification forming part of Letters Patent No. 138,340, dated April 29, 1873; application filed April 5, 1873.

*To all whom it may concern:*

Be it known that I, WILLIAM McCRAY, of Black Oak, in the county of Caldwell and State of Missouri, have invented a new and useful Improvement in Pruning-Shears, of which the following is a specification:

Figure 1 is a side view of my improved pruning-shears. Fig. 2 is a rear view of the same.

Similar letters of reference indicate corresponding parts.

My invention has for its object to furnish an improved pruning-shears, simple in construction, convenient in use, and effective in operation, the blades being held firm and steady while doing their work. The invention consists in the blades, the handles, the two parallel bars, the curved arm, and the curved bar, constructed and arranged in connection with each other, as hereinafter fully described, and in the combination of the curved arm, the keeper, and the stop, with the two parallel bars and the curved bar, as hereinafter fully described.

A and B are the two blades of the shears. The cutting-edge of the stationary blade A is made with a re-entrant angle to receive and detain the limb while being cut. The edge of the other or movable blade B is made with a rounded or convex edge to shear off the limb while detained in the angle of the blade A. C and D are the handles, which may be of any desired length. To the upper end of the handle C is attached the end of a bar, E, having the stationary blade A formed upon its forward edge near its upper end. F is a bar similar in form to the bar E, except that it has, instead of a blade, a curved arm, $f'$, made in a separate piece. The upper ends of the parallel bars E F are bolted to each other, and are kept at the proper distance apart by a washer interposed between them. The lower parts of the bars E F are bolted to each other and are kept at the proper distance apart by the end of the curved arm G interposed between them. The bars E F are bolted to each other at the base of the blade A, which bolt also secures the curved arm $f'$ to the bars E F, and pivots the blade B to and between said bars E F. The blade B is formed upon the end of the bar H, which is curved, as shown in Fig. 1, and to its lower end is attached the upper end of the handle D, the curvature of the bar H bringing the handles C D into such a relative position that they can be conveniently operated even when made long. The curved arm G passes through a keeper, $h'$, attached to the side of the bar H, and assists in giving firmness and steadiness to the shears when in operation. To the side of the curved bar G is attached a stop, I, in such a position as to strike against the curved bar H at the proper time to prevent the edges of the blades A B from coming in contact with and being dulled by the frame-work of the shears.

Having thus described my invention, I claim as new and desire to secure by Letters Patent—

1. The blades A B, handles C D, parallel bars E F, curved arm $f'$, and curved bar H, constructed and arranged in connection with each other, substantially as herein shown and described.

2. The combination of the curved arm G, keepers $h'$, and stop I, with the parallel bars E F, and curved bar H, substantially as herein shown and described.

WILLIAM McCRAY.

Witnesses:
JOHN D. COX,
CROSBY JOHNSON.